United States Patent [19]

Ingles et al.

[11] 4,328,035

[45] May 4, 1982

[54] CONSTRUCTION OF BUILDING MATERIALS

[75] Inventors: Owen G. Ingles, Kensington; Nam Lim, Chester Hill, both of Australia

[73] Assignee: Unisearch Limited, Kensington, Australia

[21] Appl. No.: 197,662

[22] Filed: Oct. 16, 1980

[30] Foreign Application Priority Data

Oct. 24, 1979 [AU]  Australia ............................... PE1054
Jun. 13, 1980 [AU]  Australia ............................... PE4034

[51] Int. Cl.$^3$ ............................................. C04B 19/04
[52] U.S. Cl. ...................................... 106/84; 501/129; 501/147; 501/150
[58] Field of Search ................ 106/67, 68, 71, 72, 106/73, 84, 900; 501/147, 150, 129

[56] References Cited

U.S. PATENT DOCUMENTS

2,801,183  7/1957  Kantzer ................................. 106/72
4,229,222  10/1980  Schneider ............................. 106/84

*Primary Examiner*—James Poer
*Attorney, Agent, or Firm*—Holman & Stern

[57] ABSTRACT

A process for the production of construction material comprising the steps of:

1. heating soil to a temperature sufficient to destroy substantially the property of the soil to swell with changing levels of moisture without causing any of the soil constituents to melt, which temperature will normally lie between 500° and 750° C. depending upon the soil type,
2. adding to the soil, either before or after the heating step, iron oxide in a finely divided form, to form a mixture and
3. introducing into, or creating within, the mixture a solution of sodium silicate, such as by adding an aqueous solution of sodium silicate to the mixture or by adding to the mixture a strong solution of sodium hydroxide and a silica source.

The construction material formed by the process, and articles formed therefrom, form part of the invention. The construction material could be used for the production of articles such as bricks or tiles or for the formation of massive structures such as building foundations or road bases.

14 Claims, No Drawings

CONSTRUCTION OF BUILDING MATERIALS

FIELD OF THE INVENTION

The present invention consists of a process for the production of construction materials, the construction materials so produced and solid articles such as bricks and tiles, produced from such construction materials.

BACKGROUND OF THE INVENTION

Conventionally bricks and tiles are formed by forming clays and some other specialised soils into a desired shape and firing the shaped articles at a temperature where at least some of the soil constituents melt and fuse together. Upon cooling the fused materials resolidify and give the properties of strength and incompressibility to the bricks and tiles. In an alternative method cement is used to bind together particles of sand to form cement bricks and tiles.

Both of these conventional processes have the disadvantage that specialised soils are required for their manufacture. Furthermore both processes are relatively energy consumptive. The firing of clay bricks and tiles requires very high temperatures while the process for the manufacture of the cement used in cement bricks and tiles is expensive. The present invention is directed to a process for the production of an alternative construction material which may be formed, inter alia, into bricks or tiles.

SUMMARY OF THE INVENTION

The present invention consists of a process for the production of construction materials from soils, comprising the steps of heating the soil to a temperature sufficient to destroy substantially the property of the soil to swell with changing levels of moisture but without causing any of the soil constituents to melt; adding to the soil, either before or after the heating step, iron oxide in a form at least as finely comminuted as the soil to form a mixture; and introducing into, or creating within, the mixture a solution of sodium silicate.

In a further embodiment this invention consists of a construction material made by a process according to the present invention. In a still further aspect the invention consists of solid articles, including but not limited to bricks and tiles, produced by forming construction material according to this invention into a desired shape and allowing the construction material to set.

DESCRIPTION OF THE PREFERRED EMBODIMENTS

The amount of iron oxide and sodium silicate preferably amounts to from 1 to 20% by weight of the total mixture and most preferably from 2 to 10% of that weight. The proportion of iron oxide to sodium silicate on a weight basis is preferably from 1:9 to 9:1 and most preferably from 1:3 to 3:1.

It is highly desirable that the mixture be compacted prior to its setting. The compaction serves to reduce the voids in the mixture thereby putting the particles of soil in closer juxtaposition prior to the setting of the mixture. The compaction has been found to increase substantially the final strength of articles formed by the method according to this invention. The compaction may be brought about by compressing the mixture in a press or by the use of a compaction roller or alternatively articles may be slip cast to bring about the desired compaction.

Commercially available solutions of sodium silicate tend to be strongly alkaline. It is desirable that the sodium silicate/iron oxide/soil mixture should be alkaline and this can be achieved by the use of the abovementioned commercial silica solutions. Preferably the pH of the mixture should be at least 11 and most preferably between 11.5 and 14. If the pH is not high enough it can be raised by the addition of sodium hydroxide or another suitable alkali.

The sodium silicate may be provided in a number of ways, the three principal of which are:
1. the addition of a sodium silicate solution to the mixture,
2. the addition to the mixture of a siliceous pozzolana containing a free silica content of at least 50% by weight of the pozzolana and a strong solution of sodium hydroxide, or
3. merely adding a strong solution of sodium hydroxide to the mixture when the soil is of a kaolinitic type.

In the first case the solution of sodium silicate preferably is added in such an amount of a solution having a density of from 1.1 to 1.5 that the weight ratio of dry iron oxide to sodium silicate solution is from 1:2 to 2:1.

In the second case the sodium silicate solution is formed in-situ in the mixture by the admixture of the siliceous pozzolana and the sodium hydroxide solution. The pozzolana, which is conveniently fly ash, powdered slag, or rice husk ash and the sodium hydroxide are preferably added in the proportions of one part by weight of $Na_2O$ to between 2 and 4 parts of $SiO_2$.

In the third case the sodium silicate solution is formed in-situ in the mixture merely by the addition of the sodium hydroxide when the soil is of a kaolinitic type. Obviously when kaolinitic soils are not available for carrying out the process then some alternative means for creating the sodium silicate solution must be used.

The mechanism of the process according to this invention is not completely understood. However is it believed that the formation of novel complex iron silicates cause adhesion between contact points of the soil particles.

While any soils may be used in the process according to this invention it is desirable that the soil be quite finely comminuted prior to being heated. The coarser the soil particles are the coarser will be the texture of the finished article.

It is known that soils contain water molecules bound in such a way that if the water molecules are driven off by heating, the soils will lose their capacity to shrink or swell with changed moisture levels. The present inventors have found that this property of soils may be destroyed by heating the soils to the temperature at which such molecules of water are driven off from the soils. This heating step may be carried out without causing any of the soil constituents to melt thereby avoiding fusing of the soil particles together.

Materials added to the soil are not required to be in pure form and waste products rich in the appropriate constituents iron oxide, sodium hydroxide and silica can be used satisfactorily as purity is not essential.

The iron oxide may be obtained from any suitable source; it should be at least as finely comminuted as the soil used in the process. The iron oxide may be added to the soil either before or after the heating step.

Once the construction material has been made it may be formed by any suitable method into the shape of a desired article such as a brick or tile. Such forming may be carried out by moulding the article or, if the composition of the construction material is suitable, by extrusion or slip forming. Once the desired article has been formed the article is allowed to set and cure until the desired strength is obtained.

The following examples serve to illustrate the present invention without limit to the generality of the foregoing.

EXAMPLE I

1. A Red Earth sample from Samford (Queensland, Australia) was crushed to −8#BSS, placed in a steel tray, and heated to 500° C. for 8 minutes in an electric muffle furnace. The heat-treated soil was then cooled in air.

2. 5% $Fe_2O_3$* (by weight) was initially mixed with the above heat-treated soil in a dry condition. Hand-mixing was continued for a sufficient time to ensure a homogeneous mix.

*$Fe_2O_3$ (fine red anhydrous as supplied from M&B Ltd., England).

3. The optimum water content of 10% was mixed with the additives (NaOH and $Na_2SiO_3$) forming a solution, whose total strength was equal to 2.5% NaOH + 2.5% $Na_2SiO_3$ by weight of the sample.

4. This solution was then added to the heat-treated soil-$Fe_2O_3$ mixture, and thoroughly mixed.

5. The homogenized mass was then pressed in a Harvard Miniature Compaction Mould** at 15 KN pressure.

**Dimensions of the cylindrical test specimen formed were: height=7.65 cm, diameter=3.85 cm.

6. The pressed product was then taken from the mould.

7. The moulded specimen was dried in air at room temperature for 7 days and tested for its physical and mechanical properties.

8. The following properties were measured for the specimen:

| | | |
|---|---|---|
| Compressive strength (kg/cm$^2$) | dry | 104.6 |
| | wet | 89 |
| Tensile strength (kg/cm$^2$) | dry | 12.8 |
| | wet | 10.6 |
| Apparent porosity (%) | | 21 |
| Water absorption (%) | | 9.2 |
| Apparent density (g/cc) | | 2.04 |
| True density (g/cc) | | 2.57 |
| Ratio (Sc/St) | | 8.17 |
| Coefficient of internal friction | | 1.56 |
| Elasticity (kg/cm$^2$) | | 1.2 × 10$^5$ |

EXAMPLE II

The procedure of Example I was repeated with the difference that the additive in step 3 was sodium hydroxide (NaOH) in an amount equal to 5% NaOH by weight of the sample.

The physical and mechanical properties of the moulded specimen were as follows:

| | | |
|---|---|---|
| Compressive strength (kg/cm$^2$) | dry | 86 |
| | wet | 55 |
| Apparent porosity (%) | | 23 |
| Water absorption (%) | | 9.8 |
| Apparent density (g/cc) | | 1.93 |

EXAMPLE III

The procedure of Example I was repeated using Home Rule kaolin from Home Rule Co., New South Wales, Australia which was heated to 600° C.

The physical and mechanical properties of the moulded specimen were as follows:

| | | |
|---|---|---|
| Compressive strength (kg/cm$^2$) | dry | 56–65 |
| | wet | 16–19 |
| Tensile strength (kg/cm$^2$) | dry | 18–23 |
| | wet | 16–18 |
| Apparent porosity (%) | | 22 |
| Water absorption (%) | | 13 |
| Apparent density (g/cc) | | 1.93 |
| True density (g/cc) | | 2.59 |
| Ratio (Sc/St) | | 5.95 |
| Coefficient of internal friction | | 1.03 |
| Elasticity (kg/cm$^2$) | | 1.3 × 10$^5$ |

EXAMPLE IV

The procedure of Example 1 was repeated using Black Earth soil from Jondaryan in Queensland, Australia. This is a swelling soil as opposed to the kaolinitic soils used in the previous examples. The soil was heated to 600° C. and a 5% solution of sodium silicate added in step 3.

The physical and mechanical properties of the moulded specimen were as follows:

| | | |
|---|---|---|
| Compressive strength (kg/cm$^2$) | dry | 20–24 |
| | wet | 12–14 |
| Tensile strength (kg/cm$^2$) | dry | 2.5–3.0 |
| | wet | 1.1–1.5 |
| Apparent porosity (%) | | 34 |
| Water absorption (%) | | 21 |
| Apparent density (g/cc) | | 1.71 |
| True density (g/cc) | | 2.63 |
| Ratio (Sc/St) | | 8.14 |
| Coefficient of internal friction | | 1.56 |
| Elasticity (kg/cm$^2$) | | 0.40 × 10$^5$ |

EXAMPLE V

The procedure of Example I was repeated using K.W.K. volclay (impure aluminum silicate) from Wyoming U.S.A. The soil was heated to 750° C. and a 5% solution of sodium silicate added in step 3.

The physical and mechanical properties of the moulded specimen were as follows:

| | | |
|---|---|---|
| Compressive strength (kg/cm$^2$) | dry | 15–17 |
| | wet | 4–6.5 |
| Tensile strength (kg/cm$^2$) | dry | 2.1–2.3 |
| | wet | 0.8–1.3 |
| Apparent porosity (%) | | 35 |
| Water absorption (%) | | 23 |
| Apparent density (g/cc) | | 1.59 |
| True density (g/cc) | | 2.40 |
| Ratio (Sc/St) | | 7.27 |
| Coefficient of internal friction | | 1.35 |
| Elasticity (kg/cm$^2$) | | 0.38 × 10$^5$ |

We claim:

1. A process for the production of construction materials from soils, comprising the steps of heating the soil to a temperature sufficient to destroy substantially the property of the soil to swell with changing levels of moisture but without causing any of the soil constituents to melt; adding to the soil, either before or after the heating step, iron oxide in a form at least as finely comminuted as the soil to form a mixture; and introducing into, or creating within the mixture, a solution of sodium silicate.

2. A process as claimed in claim 1 in which the iron oxide and sodium silicate are added to the soil in an amount of from 1 to 20% by weight of the total mixture.

3. A process as claimed in claim 2 in which the ratio of iron oxide to sodium silicate on a weight basis is from 1:9 to 9:1.

4. A process as claimed in claim 1 in which the complete mixture is compacted prior to setting.

5. A process as claimed in claim 1 in which the complete mixture is rendered alkaline prior to setting.

6. A process as claimed in claim 5 in which the pH of the complete mixture is raised to at least 11.

7. A process as claimed in claim 1 in which an aqueous solution of sodium silicate is added to the soil/iron oxide mixture.

8. A process as claimed in claim 7 in which the solution of sodium silicate has a density of from 1.1 to 1.5 and is added in such an amount that the weight ratio of dry iron oxide to sodium silicate solution is from 1:2 to 2.1.

9. A process as claimed in claim 1 in which a sodium silicate solution is created in the soil/iron oxide mixture by adding thereto a siliceous pozzolana containing a free silica content of at least 50% by weight and a strong solution of sodium hydroxide.

10. A process as claimed in claim 1 in which the soil is a kaolinitic soil and in which a sodium silicate solution is created in the soil/iron oxide mixture by adding thereto a strong solution of sodium hydroxide.

11. A construction material made by a process according to any one of claims 1 to 10.

12. Solid articles produced by forming construction material according to claim 11 into a desired shape and allowing the construction material to set.

13. A process as claimed in claim 6 wherein the pH is between 11.5 and 14.

14. A process as claimed in claim 9 wherein the siliceous pozzolana is fly ash, powdered slag, or rice husk ash, and the sodium hydroxide is added in proportion of 1 part of $Na_2O$ to 2–4 parts of $SiO_2$.

* * * * *